(12) United States Patent
Chiang

(10) Patent No.: US 6,379,062 B1
(45) Date of Patent: Apr. 30, 2002

(54) PSEUDO KEY STRUCTURE FOR A DETACHABLE KEYBOARD MODULE

(75) Inventor: Chih-Hsiang Chiang, ChungLi (TW)

(73) Assignee: Darfon Electronics Corp., TaoYuan (TW)

( * ) Notice: Subject to any disclaimer, the term of this patent is extended or adjusted under 35 U.S.C. 154(b) by 0 days.

(21) Appl. No.: 09/654,901

(22) Filed: Sep. 5, 2000

(30) Foreign Application Priority Data

Oct. 12, 1999 (TW) ..................... 88217250 U

(51) Int. Cl.[7] .............. B41J 27/02; B41J 5/10; B41J 5/08
(52) U.S. Cl. ............... 400/495; 400/492; 400/496; 400/472.1
(58) Field of Search ............... 400/495, 492, 400/496, 472.1

(56) References Cited

U.S. PATENT DOCUMENTS 4,349,286 A * 9/1982 Blaser et al. ............ 400/492
5,268,545 A * 12/1993 Bruner .................... 200/345
5,565,865 A * 10/1996 So ......................... 341/20
5,569,889 A * 10/1996 Bruner .................... 200/5
6,022,157 A * 2/2000 Shih-Hung ............... 400/490
6,104,604 A * 8/2000 Anderson et al. ......... 361/680

* cited by examiner

Primary Examiner—John S. Hilten
Assistant Examiner—Marvin Crenshaw
(74) Attorney, Agent, or Firm—Troxell Law Office PLLC

(57) ABSTRACT

A pseudo key structure for detachable keyboard module includes a cap, a shaft and a latch member. The cap has an interior accommodation space and is mounted on the base board of the keyboard module. The shaft has an upper end rotational in the cap and a lower end rotational in the accommodation space. The latch member is held in the accommodation space and is driven by the shaft. The latch member has a protrusive end engageable with a stopper formed on a base upon which the keyboard module is mounted. By turning the shaft, the protrusive end can engage/disengage with the stopper to fasten/release the keyboard module to/from the base.

10 Claims, 8 Drawing Sheets

PSEUDO KEY STRUCTURE FOR A DETACHABLE KEYBOARD MODULE

1. Field of the Invention

This invention relates to a pseudo key structure for a detachable keyboard module and more particularly to a safety latching means that can enable the keyboard module to be fastened securely without being removed arbitrarily.

2. Background of the Invention

In conventional notebook and small-size computers, a keyboard is usually made as a module mounting upon a base circuitry means. While in repair and maintenance, the keyboard has to be detached and removed away so that the circuitry means can be accessible for necessary repair and test services.

A conventional keyboard module is usually fastened to the bottom of the notebook computer by means of screws. Although the screw means can make a strong and secure engagement between the keyboard module and the base circuitry means, the assembly job of the keyboard module is yet tedious and time consuming. While re-assembling, it is obvious that the keyboard module has to be placed on a selected position in the base of the computer firstly. Then, the upper cap of the Liquid Crystal Display panel should be mounted onto the base for confining the keyboard from moving. Thereafter, the whole computer shall be turned upside down for securing the keyboard module from the bottom end of the base. When there is a need to disassemble the keyboard module for any repairing reason such as repairing the hard disk drive, CPU or interface adapter cards located inside the computer, the disassembly job is as tedious and time consuming as the assembly job set further above.

In order to resolve the assembly and disassembly problems of the conventional keyboard module, many improving techniques have been disclosed; such as the Taiwan Patent Publication No. 348863, 352167 and 356257. These prior arts all teach simpler engaging methods and structures for fastening the keyboard module to the base of the notebook computer. FIG. 1A and FIG. 1B both illustrate a same fastening means disclosed in Taiwan Patent Publication No. 356257, in which a fastening means 3 is provided with a pseudo key to the keyboard module 2. When the top surface 33 of the fastening means 3 being moved rearward, a latch lug 31 located at a front end of the fastening means 3 will be disengaged with the base 4 to enable the keyboard module 2 to be separated from the base 4. While going to engage the keyboard module 2 with the base 4, the latch lug 31 needs to be moved back into the fastening means 3 firstly for the keyboard module 2 resting into a desired position upon the base 4. Then, the top surface 33 can be released to have the latch lug 31 move automatically forward to mate with a respective part at the base 4 by a spring (not shown in figures) installed inside the fastening means 3. By such an arrangement, the keyboard module 2 can be easily assembled and disassembled.

Though the prior arts set forth above make disassembly of the keyboard module 2 from the base 4 easily for performing computer repairs and maintenance service, yet it still lacks sufficient security measures to protect the computer from being arbitrarily disassembled and thus exposed the interior circuitry and hardware. Consequently, the computer is thus prone to a higher risk of sabotage. Therefore, any improvement upon the fastening means 3 of a keyboard module 2 is believed to be welcome.

SUMMARY OF THE INVENTION

It is an object of this invention to provide a pseudo key structure for a detachable keyboard module that has a stealth latch means for securing the keyboard module onto the base and for preventing the keyboard module from being willfully removed.

It is another object of this invention to provide a pseudo key structure for a detachable keyboard module that has a latch means built in a pseudo key of the keyboard module for enabling easy repair and maintenance while, on the other hand, preventing outsiders from willfully disassembling or removing the keyboard module from the computer.

The keyboard module according to this invention includes at least one pseudo key which may fasten or disengage with the base easily. The pseudo key includes a cap, a shaft and a latch member.

The cap has an open end and an interior accommodation space, in which the cap is mounted over the base with the open end facing down.

The shaft, located inside the accommodation space, can be turned with the cap and has thereof an upper end connected with the cap and a lower end extending into the accommodation space.

The latch member, located inside the accommodation space, is driven by the lower end of the shaft and has a protrusive end.

According to the present invention, the base has a stopper engageable with the latch member. Turning the upper end of the shaft to a selected angle through acting upon the cap may make the lower end moving the latch member in one direction so that the protrusive end may engage with the stopper to fasten the keyboard module onto the base. On the other hand, turning the upper end to another angle may move the latch member to anther direction to disengage the protrusive end from the stopper so that the keyboard module may be detached and can be removed from the base.

The cap may have two sidewalls bordering the open end with at least two snap hooks extending downward from the sidewalls for engaging the keyboard module and the base.

The cap may also have a top opening to enable the upper end of the shaft held and turning therein. The upper end may have a slot formed at the top thereof for a screw driver to turn the shaft thereby.

In one embodiment of the present invention, the shaft may be formed in the shape of a crank shaft. The latch member may be integrally formed as the lower end of the shaft to become a cam structure.

In one embodiment of the present invention, the shaft may be formed in the shape of a crank shaft, and the latch member may include an elongated slot for allowing the lower end of the shaft to slide along. Upon such an arrangement, linear motion of the latch member and the protrusive end can be constructed.

In one embodiment of the present invention, the cap and the shaft can be integrally formed, and the lower end of the shaft can be pivotally held in the base. Thus, the cap and shaft may be turned on the base concurrently.

In one embodiment of the present invention, the stopper may extend upward from the base and protrude into the accommodation space of the pseudo key. The stopper can further include a latching slot located inside the accommodation space for engaging with the protrusive end of the latch member. In this embodiment, the cap and the shaft can be integrally formed. The latch member may be formed either on the cap or on the shaft, and may have the protrusive end extended inside the accommodation space.

In one embodiment of the present invention, the stopper of the base may be located at an edge adjacent to the pseudo key. By the opening end of the cap formed as an extension of the pseudo key, the latch member of the cap may thus engage with the stopper of the base.

In one embodiment of the present invention, the shaft can be omitted and the latch member can be formed on an interior wall of the cap. The stopper of the base may extend upward from the base and protrude into the accommodation space of the pseudo key for engaging with the latch member.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1A:
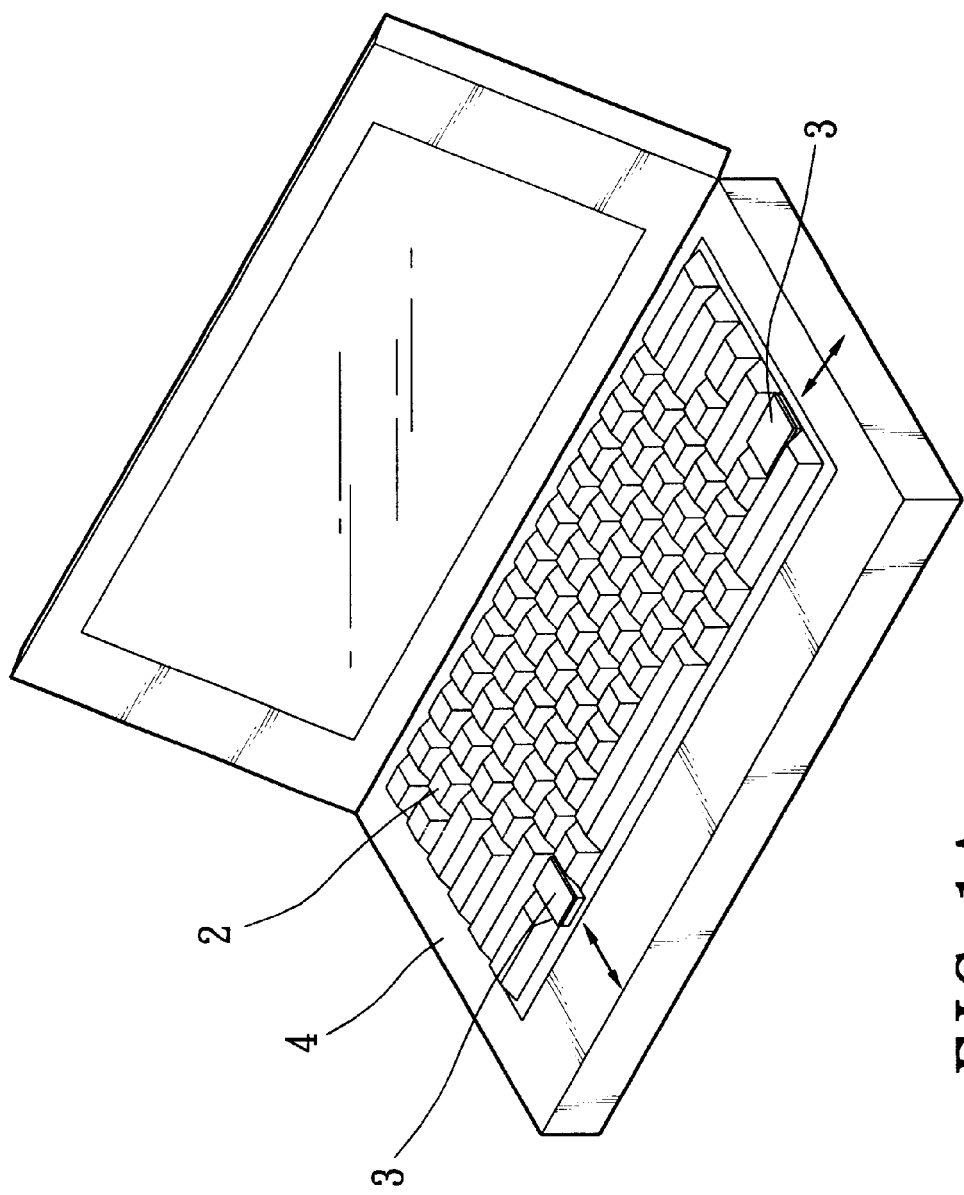
FIG. 1A is a perspective view of a conventional latch means for fastening a keyboard module in a notebook computer.

In the following description, components having same function will be marked by same numerals to promote the explanation of the following description.

FIG. 2 through FIG. 5 illustrate various embodiments of the pseudo key structure for the detachable keyboard module according to this invention. The keyboard module 2 has a base board 21 upon which at least one pseudo key 5 can be located. The keyboard module 2 is detachably mounted on a base 4. The pseudo key 5 has a cap 51, a shaft 53 and a latch member 55.

The cap 51 has an open end 511 and an accommodation space 513, in which the cap 51 is mounted on the base board 21 with the open end 511 facing down.

The shaft 53 has an upper end 531 turnably located at the top of the cap 51 and a lower end 533 extending into the accommodation space 513.

The latch member 55, located inside the accommodation space 513 and driven by the lower end 533 of the shaft 53, has a protrusive end 551.

The base 4 has a stopper 411 engageable with the latch member 55. When the upper end 531 is turned for outside of the cap 51, the lower end 533 will move the latch member 55 as well as the protrusive end 551 to engage with the stopper 411 for fastening the keyboard module 2 with the base 4. When the upper end 531 is turned to an opposing direction, the lower end 533 may move the latch member 55 to disengage from the stopper 411 for unlatching the keyboard module 2 from the base 4. The keyboard module 2 then may be detached and removed from the base 4.

The pseudo key 5 may be located at a blank key location or any suitable location in the keyboard module 2. For example, the pseudo key 5 may be located at an LED display key location on the keyboard module 2. According to the present invention, the number and location of the pseudo keys depends on the requirements of fastening and supporting of the keyboard module 2 on the base 4. The hinge between the base board 21 and the base 4 is well known in the art and forms no part of this invention, thus will be omitted here.

Following are preferable embodiments of this invention.

First embodiment

Figure 2:
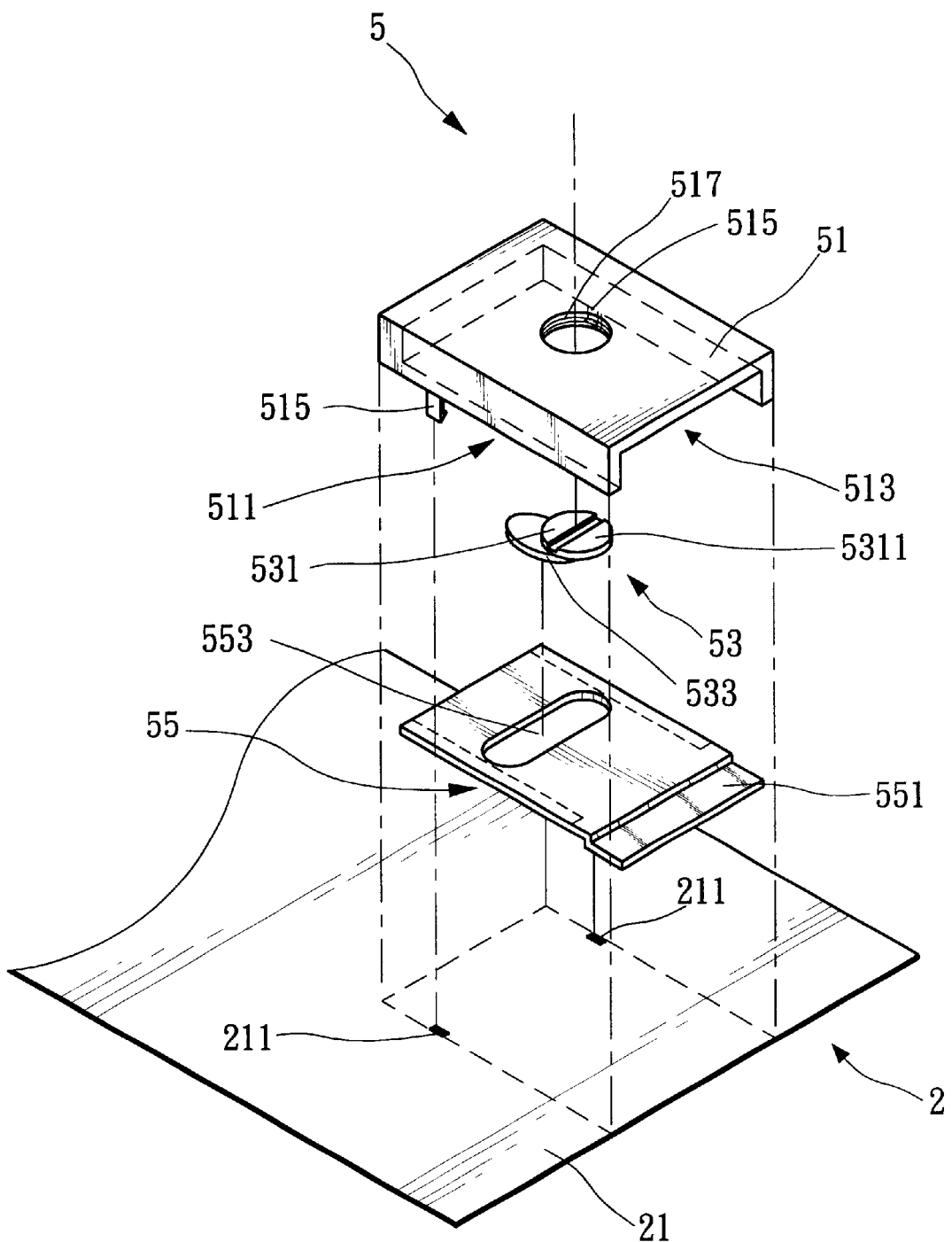
FIG. 2 is an exploded perspective view of a first embodiment of this invention.
Figure 3A:
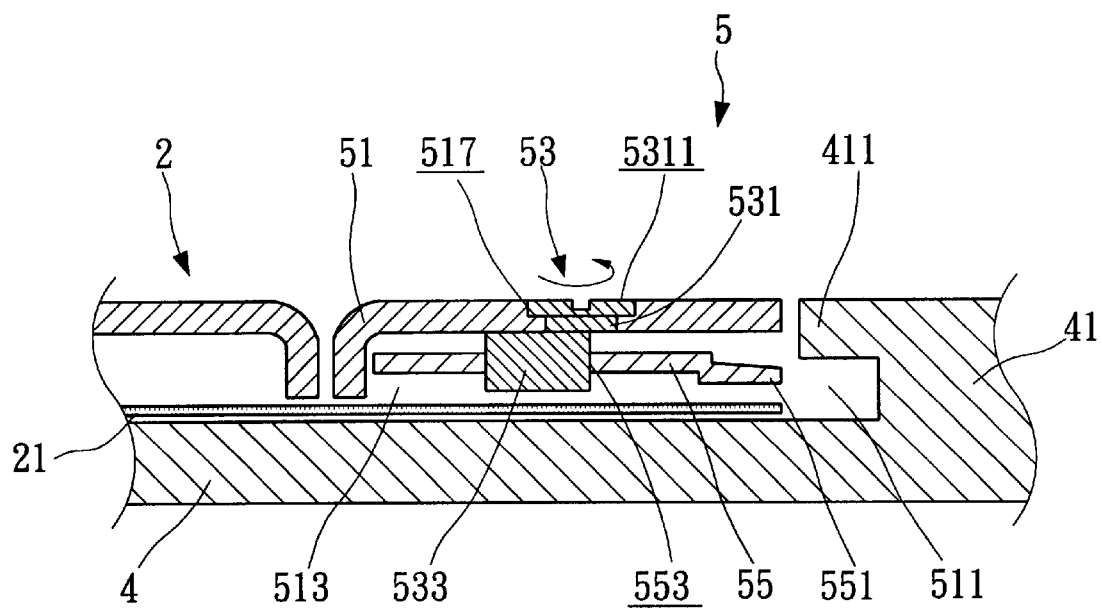
FIG. 3A is a fragmentary sectional view of the first embodiment shown in FIG. 2, at a disengagement state.
Figure 3B:
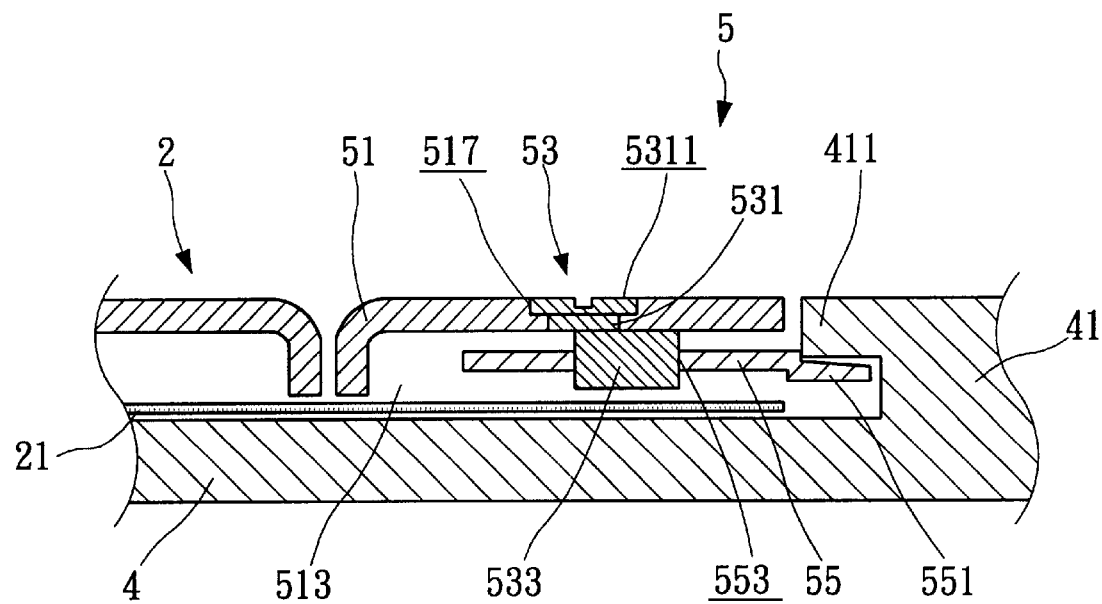
FIG. 3B is a fragmentary sectional view of the first embodiment shown in FIG. 2, at a fastened state.

FIGS. 2, 3A and 3B show the first embodiment of this invention. The cap 51 has an open bottom end 511 bordered with at least two sidewalls, in which each sidewall has at least one snap hook 515 formed thereunder for engaging with a respective slot 211 formed on the base board 21, by which the cap 51 can be firmly mounted on the keyboard module 2 to form a pseudo key 5.

The shaft 53, formed as a crank shaft member, includes an upper end 531 held in a top opening 517 formed at the top of the cap 51 and a lower end 533 eccentrically located below the upper end 531. The upper end 531 further has a notch slot formed in the top end 5311 for enabling service people to use a hand tool to turn the shaft 53. The latch member 55 has an elongated slot 553 engageable with the lower end 533 and a protrusive end 551 located at one side. Rotation of the shaft 53 may be converted into liner motion of the protrusive end 551 through the lower end 533 rotating in the opening 553.

On the other hand, the base 4 has a stopper 411 formed at an edge 41 facing the pseudo key 5 and the stopper 411 is engageable with the protrusive end 551.

When the protrusive end 551 is disengaged with the stopper 411 (shown in FIG. 3A), the keyboard module 2 may be removed from the base 4 for service people to perform repairing and test work on the circuit located under the keyboard module. When using a hand tool (such as a screw driver) to turn the upper end 531 and the lower end 533 for further pushing the latch member 55 toward the edge 41, the protrusive end 551 may latch below the stopper 411 to form a fastening position (FIG. 3B). The keyboard module 2 is thus securely fastened to the base 4. Thus, the keyboard module 2 cannot be arbitrarily removed from the base 4 except using a handtool to turn the upper end 531 of the shaft 53.

Second embodiment

Figure 1B:
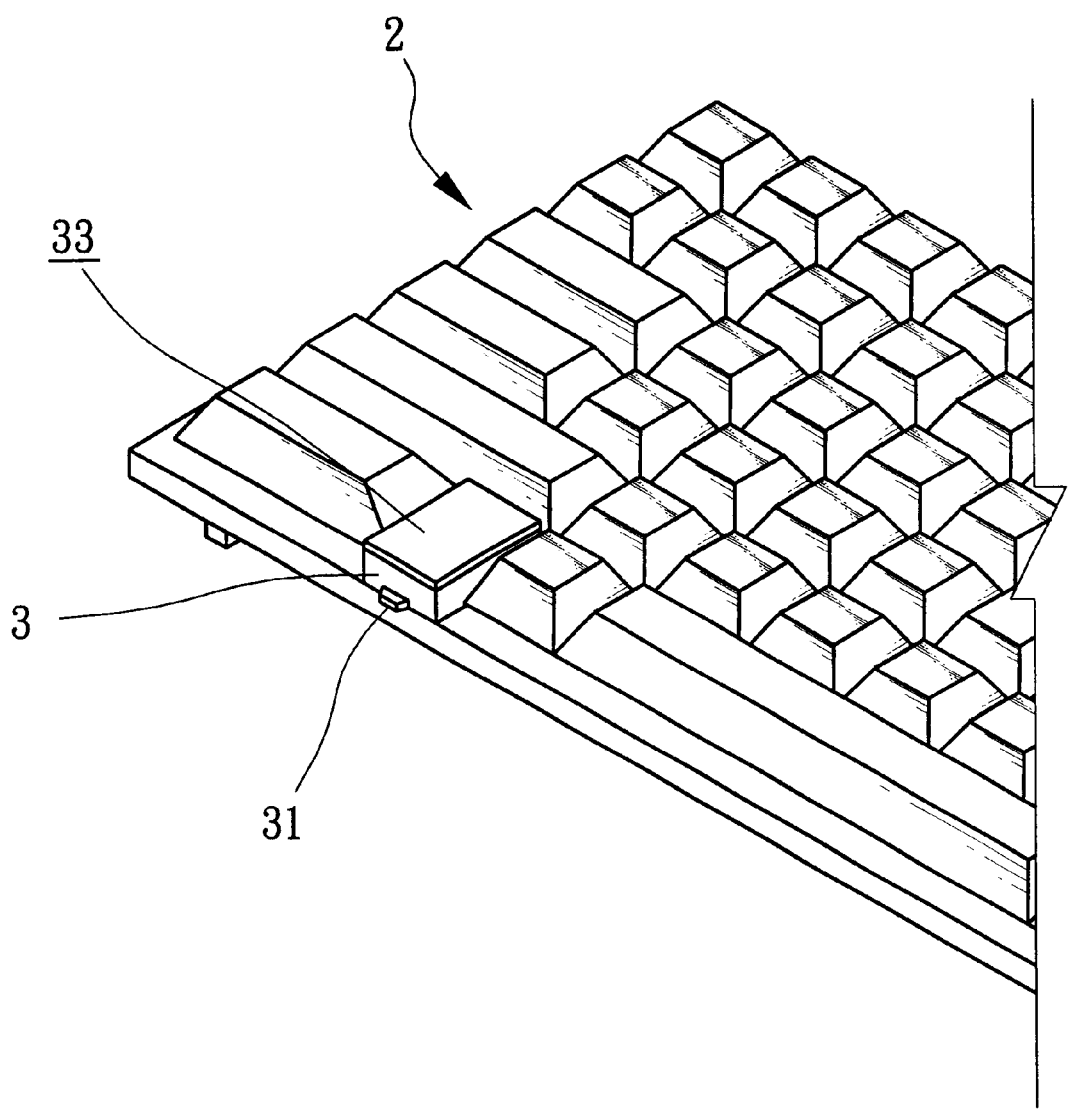
FIG. 1B is a fragmentary perspective view of the latch means shown in FIG. 1A.
Figure 4:
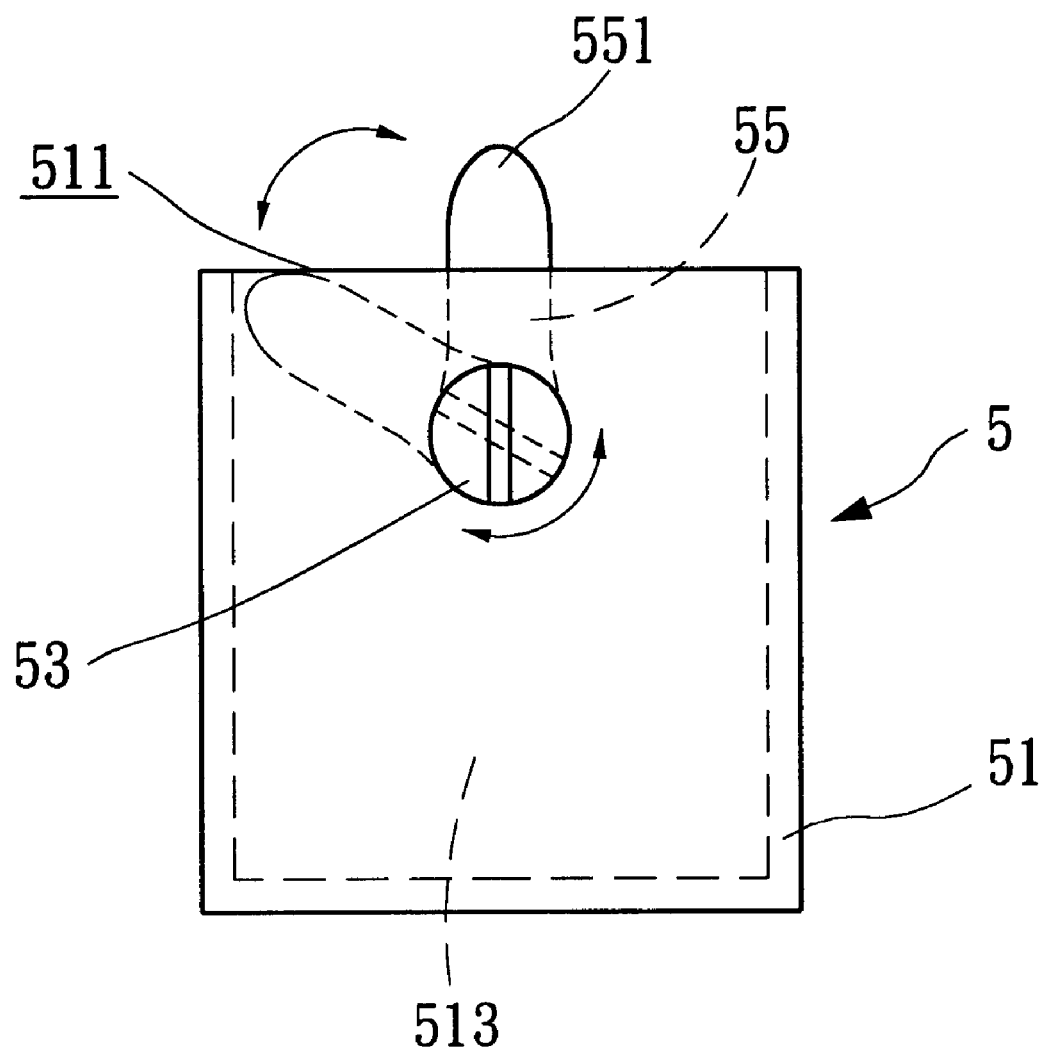
FIG. 4 is a top view of a second embodiment of this invention.

FIG. 4 shows the second embodiment of this invention. It is largely constructed like the first embodiment shown in FIG. 1, except that the latch member 55 is integrally formed with shaft 53 to generate a crankshaft structure. The latch member 55 has a finger type protrusive end 551.

When the shaft 53 is turned and further moves the protrusive end 551 under the stopper (shown by a solid line in FIG. 4, but the base and stopper are not shown), the keyboard module 2 is latched and fastened with the base. When the protrusive end 551 is moved away from the stopper by the shaft 53 (shown by a broken line in FIG. 4), the keyboard module at this stage can be removed from the base.

Third embodiment

Figure 5A:
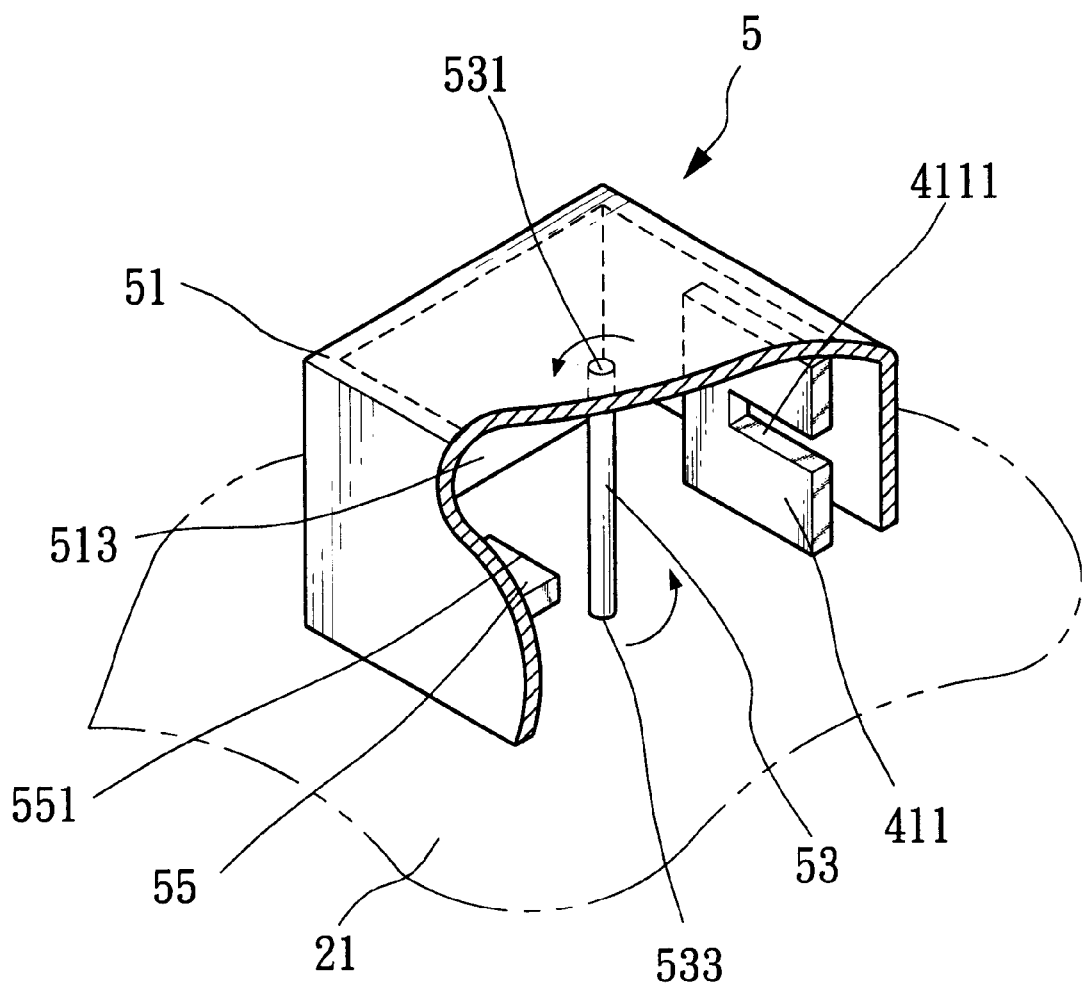
FIG. 5A is a fragmentary perspective view of a third embodiment of this invention, at a disengagement state.
Figure 5B:
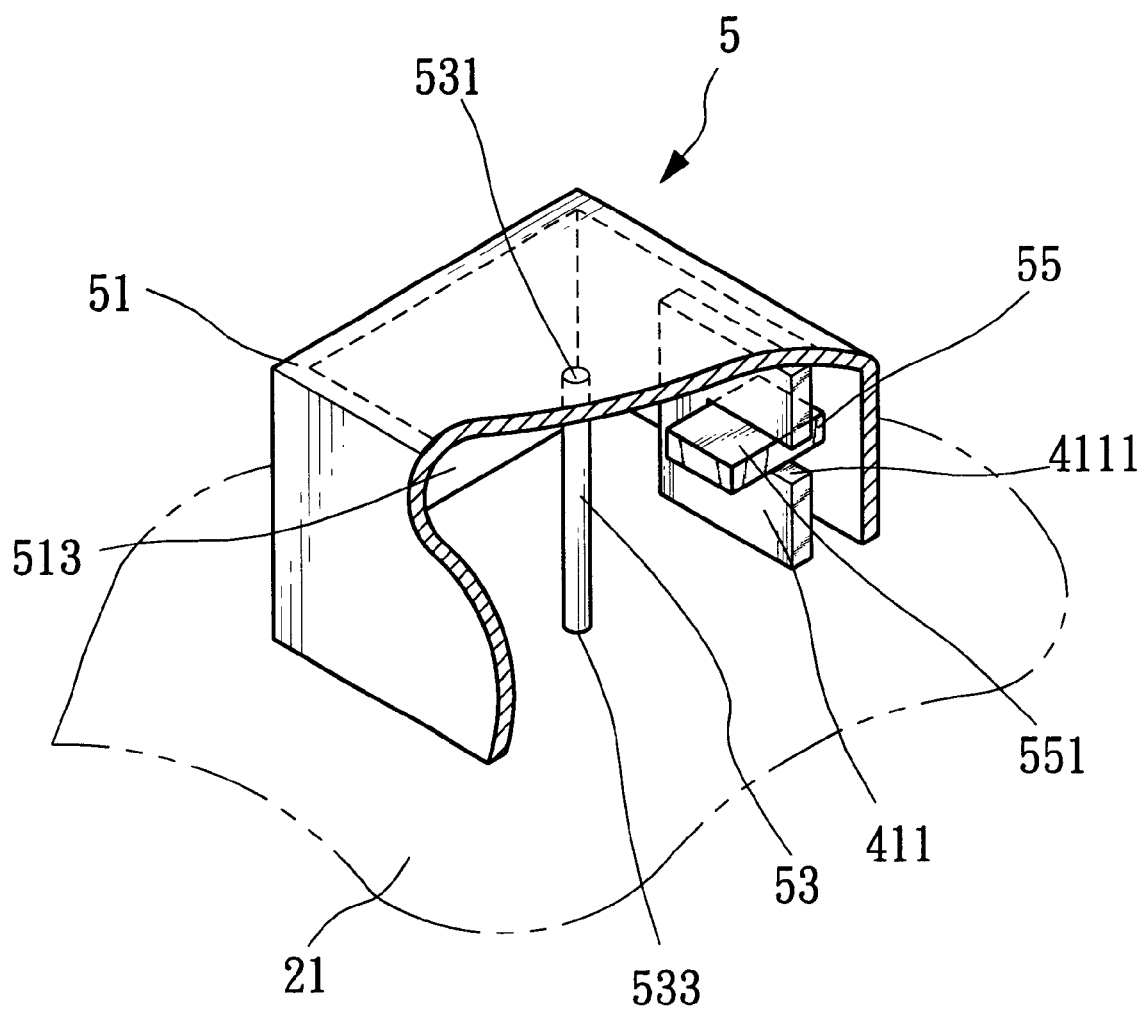
FIG. 5B is a fragmentary perspective view of a third embodiment of this invention, at a fastened state.

FIGS. 5A and 5B show the third embodiment of this invention. The main difference with the first and second embodiments is that the shaft 53 and the cap 51 are integrally formed and the low end 533 of the shaft 53 is pivotally mounted in the base board 21. In this embodiment, turning the cap 51 is directly leading to the rotation of the shaft 53.

In this embodiment, the latch member 55 is transversely formed on the cap 51 (for example, formed on an interior wall of the cap 51 shown in FIG. 5A) or on the shaft 53 with its protrusive end 551 extending into the accommodation space 513. The stopper 411 is extending upward from the base 4 and passing through the base board 21 to the accommodation space 513, in which a respective latch slot 4111 is formed therein. FIG. 5A shows that the protrusive end 551 is engageable from the latch slot 4111. The keyboard module 2 can thus be free from being removed from the base. By turning the cap 51 to engage the protrusive end 551 with the latch slot 4111 (FIG. 5B), the keyboard module 2 can be fastened to the base.

Fourth embodiment

Figure 6A:
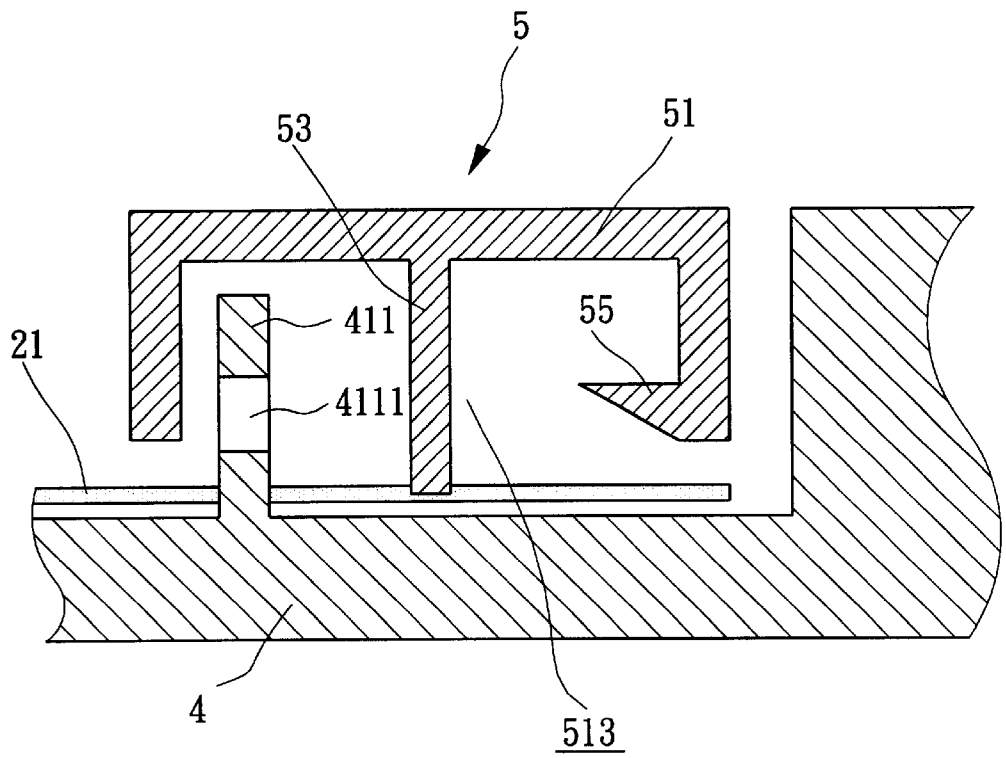
FIG. 6A is a sectional view of a fourth embodiment of this invention, at a disengagement state.
Figure 6B:
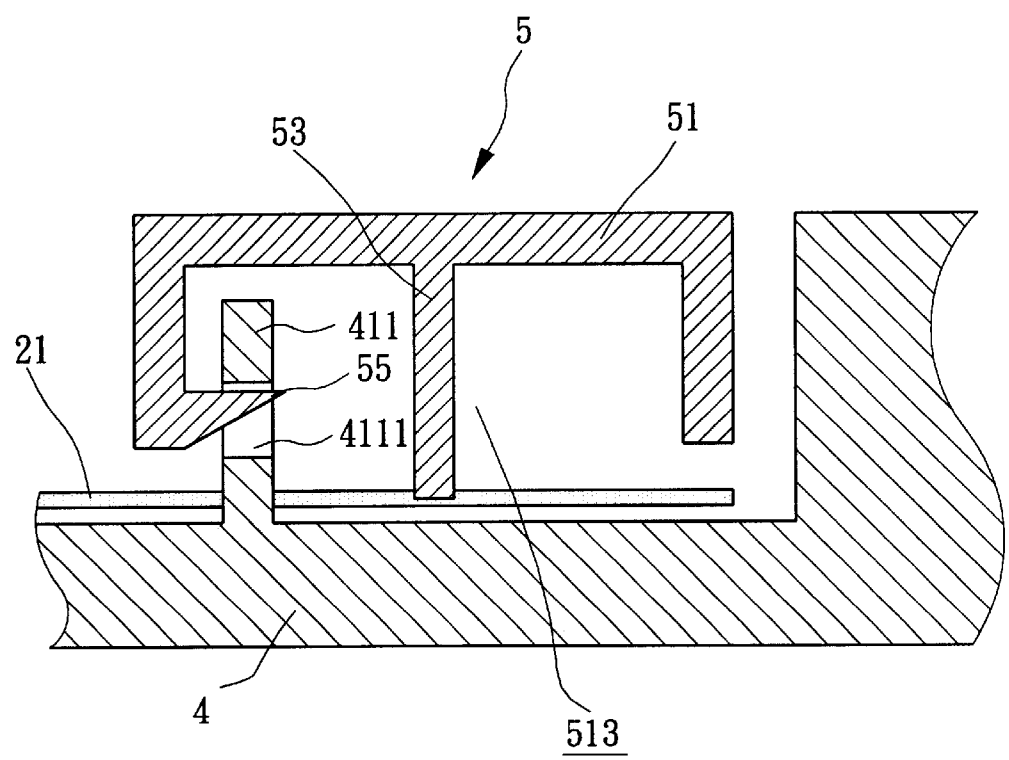
FIG. 6B is a sectional view of a fourth embodiment of this invention, at a fastened state.

FIGS. 6A and 6B show the fourth embodiment of the present invention. It is largely constructed like the third embodiment shown in FIG. 5A. The shaft 53 is integrally formed with the pseudo key 5 with a lower end pivotally held in a bore formed in the base board 21 for supporting and positioning of the pseudo key 5. The latch member 55 is located on an interior wall of the cap 51 and extending toward the accommodation space 513 provided by the pseudo key 5. The stopper 411 extends upward from the base 4 and passing through the base board 21 into the accommodation space 513, and has a latch slot or opening 4111 formed thereof at an the protruding end inside the accommodation space 513. FIG. 6A shows the pseudo key 5 disengaged with the stopper 411 to form a keyboard module detachable state. By moving the pseudo key 5 up and turning it 180 degree, the latch member 55 may be engaged with the stopper 411 through the latch slot 4111 (FIG. 6B). The keyboard module then may be fastened securely to the base 4.

While the pseudo key 5 of this embodiment may include thereinwith LED or the like, those parts constructed inside pseudo key 5 usually can present some supporting function that the shaft 53 plays in previous embodiments. In such cases, the shaft 53 may be dispensed with.

While aforesaid embodiments have the pseudo key built in the keyboard module and the stopper built in the base, it may function equally well to have the pseudo key built in the base (preferably adjacent a side edge of the keyboard module) and the stopper built in the base board of the keyboard.

Through the structure of this invention, the pseudo key may fasten the keyboard module securely to the base to prevent ordinary users from willfully removing the keyboard module from the base. Also, service people may easily disengage the keyboard module from the base by means of a simple handle tool to perform repairs and maintenance work.

It may thus be seen that the objects of the present invention set forth herein, as well as those made apparent from the foregoing description, are efficiently attained. While the preferred embodiments of the invention have been set for the for purpose of disclosure, modifications of the disclosed embodiments of the invention as well as other embodiments thereof may occur to those skilled in the art. Accordingly, the appended claims are intended to cover all embodiments which do not depart from the spirit and scope of the innovation.

What is claimed is:

1. An apparatus for detachably mounting a keyboard module to a base comprising:
   a) a base having a stopper; and,
   b) a keyboard module having at least one pseudo key, the pseudo key comprising:
      i) a cap having an accommodation space therein;
      ii) a rotatable shaft engaged with the cap and having a lower end extending into the accommodation space;
      iii) a latch member having a protrusive end, the latch member being movable with rotation of the rotatable shaft between a latched position in which the protrusive end engages the stopper to attach the keyboard module to the base, and an unlatched position in which the protrusive end is disengaged from the stopper, enabling the keyboard module to be removed from the base.

2. The apparatus of claim 1 wherein the rotatable shaft is rotatably mounted on the cap so as to rotate relative to the cap.

3. The apparatus of claim 2 wherein the latch member is attached to the lower end of the shaft so as to rotate therewith.

4. The apparatus of claim 3 wherein the rotatable shaft has an upper end having a notch therein to facilitate rotation of the shaft.

5. The apparatus of claim 2 further comprising:
   a) at least one slot in the keyboard module; and,
   b) at least one snap hook extending from the cap and engaging the at least one slot.

6. The apparatus of claim 2 further comprising:
   a) an elongated opening in the latch member; and,
   b) an eccentric member on the rotatable shaft engaging the elongated opening.

7. The apparatus of claim 1 wherein the lower end of the shaft is rotatably mounted on the keyboard module and an upper end of the shaft is connected to the cap such that the cap is rotatable with the shaft.

8. The apparatus of claim 7 wherein the latch member extends from the cap into the accommodation space.

9. The apparatus of claim 8 wherein the stopper is located in the accommodation space.

10. The apparatus of claim 9 further comprising a latch slot in the stopper engageable by the protrusive end of the latch member.

* * * * *